C. K. STINSON.
RESILIENT TIRE.
APPLICATION FILED FEB. 11, 1914.
1,109,261.  Patented Sept. 1, 1914.
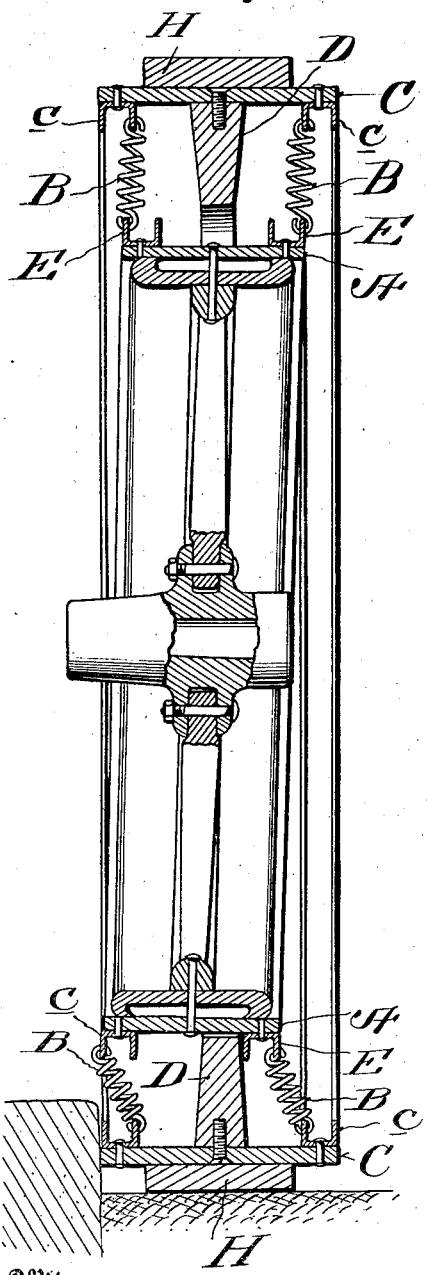
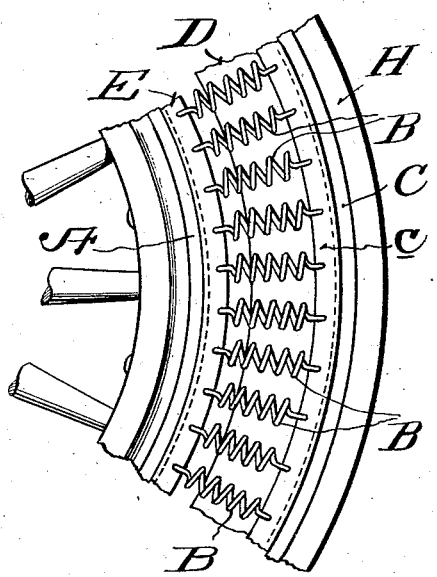
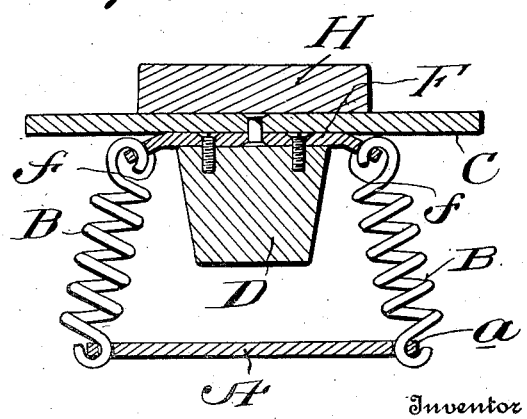

UNITED STATES PATENT OFFICE.

CHARLES K. STINSON, OF TEMPLETON, MASSACHUSETTS.

RESILIENT TIRE.

1,109,261.      Specification of Letters Patent.      Patented Sept. 1, 1914.

Continuation of application Serial No. 650,169, filed September 19, 1911. This application filed February 11, 1914. Serial No. 818,000.

*To all whom it may concern:*

Be it known that I, CHARLES K. STINSON, a citizen of the United States, residing at Templeton, in the county of Worcester and State of Massachusetts, have invented certain new and useful Improvements in Resilient Tires, of which the following is a specification.

My invention relates to resilient tires for vehicles in which a floating outer rim operates in conjunction with coiled springs to produce resiliency, the objects of my invention being first, to provide an operative resilient vehicle tire without the use of rubber as the elastic factor, second, to adequately protect the springs employed from injury incident to their use near the ground.

Other objects and advantages will be apparent from the following description.

This application is a continuation of my application for shock absorbing vehicle tires filed September 19, 1911 Serial Number 650,169, and referring to like subject matter.

I attain these objects in the manner illustrated in the accompanying drawings in which—

Figure 1, is a vertical cross section through a motor vehicle wheel showing the construction of the tire, the arrangement of its parts, and its action when striking an obstacle at the side of a wheel. Fig. 2, is a side view of a portion of the tire showing the circumferential arrangement of the springs. Fig. 3, is a cross section of a modified form of the tire.

Similar letters and figures refer to similar parts through out the several views.

With reference to the drawings A designates the inner rim of the tire and B a plurality of sets of coil springs arranged circumferentially at or near its edges, and C a rigid floating guard rim wider than the inner rim and having a pair of channel irons $c$ secured around its inner periphery, to hold the outer ends of the coiled springs, said channel irons being spaced in from the edges of the guard rim a sufficient distance to secure protection for the coiled springs.

D is a narrow buffer secured to the inner periphery of the guard rim and centrally located between the rows of coiled springs. It extends inwardly toward the inner rim A, but normally has no contact with it. In case of sudden jar it arrests the travel of the inner rim toward the outer, regulating the motion and preserving the springs from either crushing or over stretching.

The coiled springs are arranged close together circumferentially and form elastic screens at each side of the tire sufficiently close to exclude objects that would otherwise enter between and injure the springs. The springs B are preferably secured to the innermost sides of the channel irons $c$ secured to the outer or guard rim, and the opposite ends of said springs are secured to the outermost edges of similar but oppositely disposed channel irons E secured adjacent the edges of and to the outer periphery of the inner rim A, as clearly shown in Fig. 1. However, this structure whereby the springs are secured to the two rims may be modified or changed. For example, as shown in Fig. 3, I may secure the inner edges of the coil springs through openings $a$ in the inner rim A, and secure the outer edges thereof through openings $f$ in the auxiliary band F secured to inner periphery of the guard rim C. In this modification the buffer D is secured to the inner periphery of the auxiliary band F. A suitable tread H of any suitable material may be secured to the exterior of the guard rim C. The springs B preferably are normally of a length less than the normal distance between the adjacent channel irons on the inner and outer rims, and in assembling the tire, one end of each spring is secured to a channel iron on one rim and then stretched or put under tension to bring its opposite end into position to be secured to the channel iron on the same side of the other rim. In the modification shown in Fig. 3 the springs are likewise stretched into operative position, but the ends are secured in the openings in the band and the inner rim and not into the openings in the channel irons, as in the modification shown in Figs. 1 and 2.

In operation, the springs are always under tension and support the load on the wheel axle by yieldingly suspending the axle from the rigid outer or guard rim C. When an obstruction in the road is encountered, the outer rim will move eccentrically with regard to the inner wheel and further stretch the springs B in the upper portion of the wheel. The buffer D will contact with the inner rim when an excessive shock is encountered and prevent further eccentric movement of the inner or outer rims relatively to each other. It will therefore be seen that the essential parts of the invention are the guard rim in conjunction with the buffer, the inner rim, and the coiled springs arranged under tension between the rims.

Having described by invention, what I desire to secure by Letters Patent of the United States is:—

In a vehicle tire, an inner rim, an outer rim of greater width than said inner rim, a buffer connected to the outer rim and extending toward the inner rim, channel members secured adjacent the edges of said inner and outer rims, and a series of coiled springs arranged on each side of said buffer and connected to the inner sides of the channel members secured on the outer rim, and to the outer sides of the channel members secured on the inner rim.

In testimony whereof I affix my signature in presence of two witnesses.

CHARLES K. STINSON.

Witnesses:
A. M. PARKINS,
HELGE MURRAY.